Patented Mar. 7, 1933

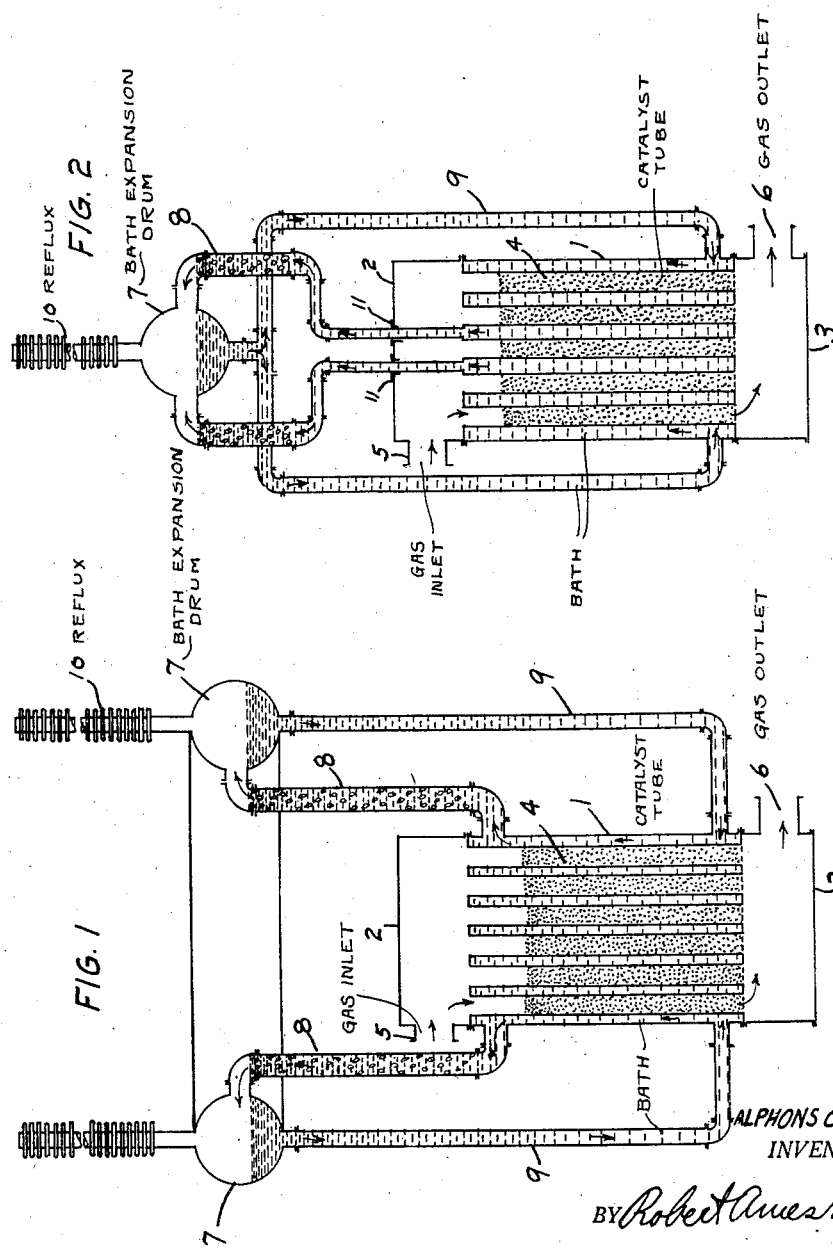

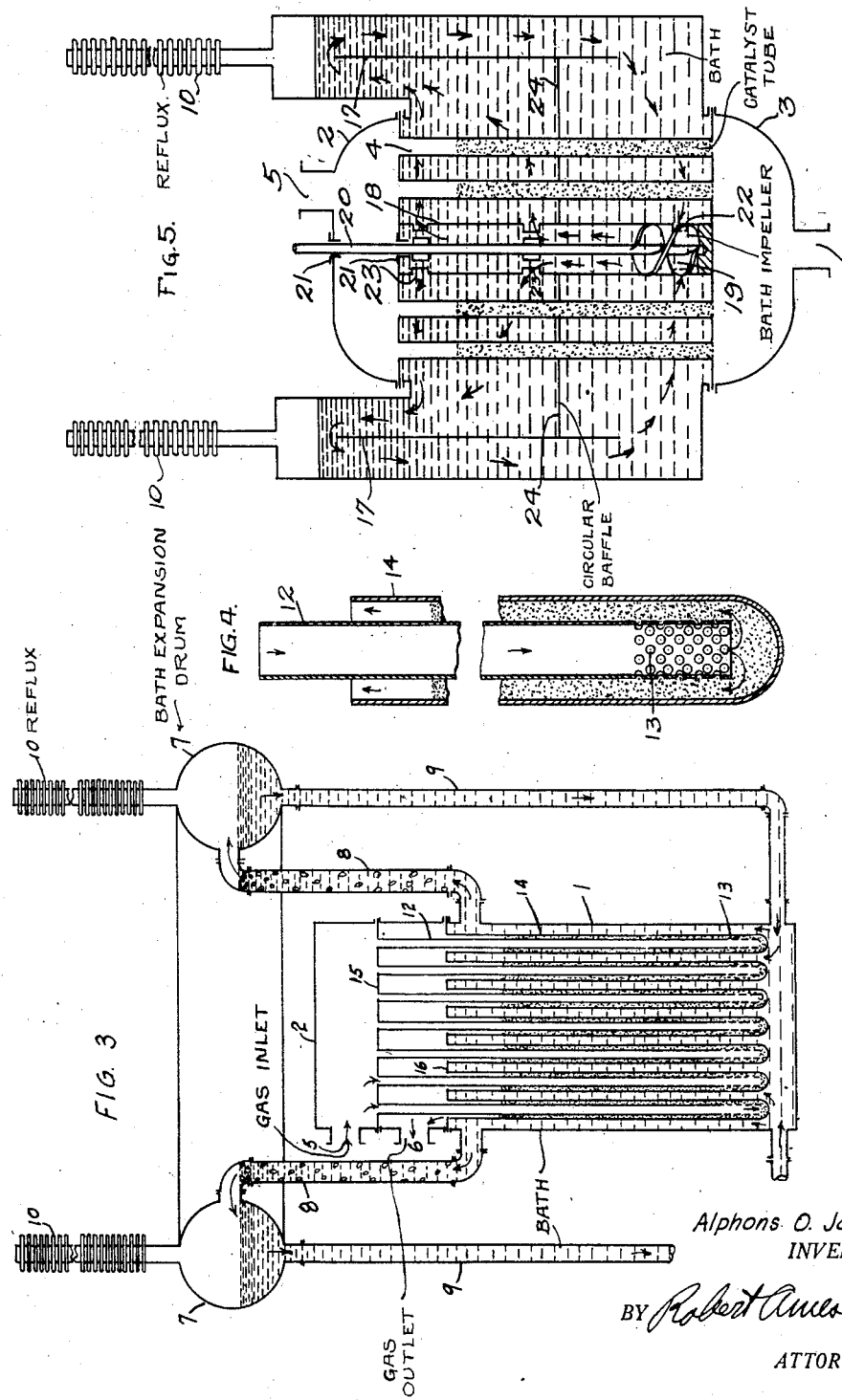

1,900,715

UNITED STATES PATENT OFFICE

ALPHONS O. JAEGER, OF CRAFTON, PENNSYLVANIA, ASSIGNOR, BY MESNE ASSIGN-
MENTS, TO THE SELDEN RESEARCH & ENGINEERING CORPORATION, OF PITTS-
BURGH, PENNSYLVANIA, A CORPORATION OF DELAWARE

METHOD OF CARRYING OUT EXOTHERMIC CATALYTIC VAPOR PHASE REACTIONS

Application filed May 4, 1928. Serial No. 275,044.

This invention relates to methods and apparatus for carrying out catalytic reactions and more particularly for carrying out exothermic vapor phase catalytic reactions, such as the oxidation of organic compounds.

In the past exothermic catalytic reactions, such as, for example, oxidation of organic compounds, have been carried out in converters cooled by various means. The most strongly exothermic reactions, such as, for example, the oxidation of aromatic hydrocarbons, for example naphthalene to alpha-naphthaquinone, phthalic anhydride, and maleic acid; benzol, phenol, or tar phenols to maleic acid; toluol to benzaldehyde and benzoic acid; anthracene to anthraquinone; acenaphthene to naphthalic anhydride; and the like have usually been carried out in tubular converters using small catalyst tubes surrounded by effective cooling baths, such as, for example molten metal baths, as lead and the like, or baths of fusible salts, such as, for example, eutectic mixtures of sodium nitrate and sodium nitrite. These baths, when properly circulated, permit an effective control, the exotherm being absorbed in the form of sensible heat. The control of cooling, however, is not automatic and necessitates in many cases considerable supervision.

An automatic cooling method has been used in which the bath boils at about the temperature of reaction and the heat of the catalyst is absorbed in the form of latent heat of vaporization without change of temperature. Such baths are mercury, mercury alloys, and the like, which may boil under atmospheric pressure or in the case of mercury under predetermined pressure when a higher boiling point is desired. This method of control of exothermic catalytic reactions has the great advantage that it is automatic in nature within limits, that is to say fluctuations in exotherm do not result in corresponding fluctuations in bath temperature but are taken care of by a greater or less ebullition at the same temperature. Despite the advantages of automatic control which such a system possesses, there are numerous disadvantages. It is only possible to fill a converter part full of catalyst and of bath as a vapor space must be left. This reduces the length of catalyst which can be used in a converter of given size. Another even more serious disadvantage lies in the fact that the boiling takes place directly in contact with the catalyst tubes or zones and as the bath liquids used normally are of high specific gravity, particularly in the case of mercury and mercury lead alloys, there is a serious tendency for bubbles of vapor to form in contact with the catalyst tubes and to act, at least temporarily as insulating layers for, as is a well known physical fact, a vapor is a much poorer conductor of heat than is a liquid. Another disadvantage lies in the fact that in most practical converter designs it is desirable to pass the gases downwardly through a vertical converter in order to effect a more intimate contact. A boiling liquid, however, will not circulate downwards and if strongly heated in its upper portion and not heated sufficiently in its lower portion the upper layers may boil and no positive control of the temperature of the lower layers is obtained. In the ordinary type of converter with a down flow of gas this is very apt to happen as the greatest heat is evolved in the upper portion of the contact mass which encounters the fresh reaction gases and where, therefore, the reaction is most violent.

Another disadvantage of the method of controlling catalytic reactions by surrounding the tubes with a boiling bath lies in the fact that if the object of this method of control is achieved, that is to say uniform temperature throughout the bath liquid, this will not permit the carrying out of many reactions under optimum conditions. This is ordinarily true of equilibrium reactions, such as the contact sulfuric acid process, and of many organic oxidations to intermediate products which are relatively unstable at high temperatures in contact with the catalyst. In equilibrium reactions the temperature for maximum practical reaction velocity is normally higher and in many cases much higher, for instance 100–

200° C. higher than the reaction temperature for optimum equilibrium, that is to say highest percentage conversion to the desired product. Similarly in many organic oxidations the main reaction in the portion of the catalyst encountered by the fresh gases should be advantageously carried out at a higher temperature than the last portions of the reaction where a large concentration of the reaction product is present and where it is desirable to prevent decomposition of the product. This necessitates different temperatures in different portions of the converter and in the ordinary downflow type of tubular converter normally the upper portion should be at a higher temperature than the lower portion. For this reason converters in which the catalyst tubes or zones are completely surrounded by a boiling bath have proved to be dismal failures for the contact sulfuric acid process.

The present invention retains the advantages of automatic temperature control, or perhaps more correctly automatic heat removal, without the disadvantages inherent in the method which surrounds the catalyst zones with a boiling bath. According to the present invention a closed circuit bath system is used with a bath liquid, for example a metal or metal alloy or other suitable liquid, which under atmospheric pressure boils at or preferably below the desired bath temperature in contact with the hottest catalyst zone. This bath is caused to circulate around the catalyst compartments and is provided with suitable external cooling, the portion of the bath in contact with the catalyst compartments being under sufficient pressure so that it will not boil and the pressure being released in another portion of the circuit external to the catalyst zone or converter and the bath being permitted to boil to automatically compensate for fluctuations in heat absorption.

The process of the present invention is not limited to any particular apparatus design and the variations in pressure in the different portions of the circulating liquid may be effected in any desirable or suitable manner. Since, however, the metal alloys and metals such as mercury which may be considered as the preferred bath liquids for use in the present invention have a very high specific gravity, the difference in pressure can be obtained in a simple and entirely automatic manner by raising the level of the liquid in the highest portion of the system sufficiently above the portion in contact with the catalyst zone so that the hydrostatic pressure due to the difference in level will be sufficient to prevent the liquid from boiling in contact with the catalyst zones. When the method of the present invention is carried out in connection with the preferred type of converter, that is to say vertical tubular converters, a suitable vapor disengaging vessel or drum is placed at a sufficient level above the top of the catalyst tubes so that the bath in the converter which is, of course, completely filled with bath liquid is at a pressure such that the liquid will not boil in contact with the catalyst tubes, ebullition taking place only in the portions of the system above the converter or catalyst zone. From the lower portion of the vapor disengaging drum suitable return connections carry the liquid back to the bottom of the converter and such connections may be provided with any suitable cooling means, this problem being extremely simple as the high temperatures encountered in most highly exothermic catalytic reactions, such as the oxidation of organic compounds, will provide sufficient cooling even when the return pipes are lagged for a considerable, and in some cases for their whole length. It will be clear, of course, that variations in the amount of heat insulation may be used to control the cooling in any desired manner. Of course, suitable reflux condensers will be provided so that the vapors disengaged in the drum will be recondensed and returned to it.

The circulation in the preferred type where the variations in pressure are effected hydrostatically is very rapid, for it is possible and in many reactions extremely desirable to permit a temperature difference as high as 100° and sometimes as much as 200° C. between the bottom of the converter and the top, the circulating bath is heated up in passage over the catalyst tubes to a temperature which is normally above its boiling point at atmospheric pressure and which in an extreme case may be just below its boiling point at the pressure existing in the upper part of the converter. As the hot bath rises in the connections to the vapor disengaging drum the pressure on it decreases and if it has been heated up almost to the boiling point under the higher pressure obtaining in the converter bubbles will begin to form in the riser pipes or connections which will rapidly accelerate the flow, giving what may be called a geyser action. The amount of acceleration which the flow receives from this geyser action will normally vary with the temperature to which the liquid is heated before it leaves the converter, that is to say with the exotherm of the reaction. In other words, a circulating system is present which automatically and very rapidly increases its circulating speed with increase of heat absorbed per unit time. At the same time the temperature of the liquid in the drum, which to a large extent controls the temperature of the returning liquid, is maintained constant for, of course, it must be at the boiling point of the liquid at atmospheric pressure. All excess heat is, of course, removed at constant temperature by boiling of the liquid in the drum and the vapors are condensed in reflux condensers, returning condensate at the same temperature.

For most purposes it is desirable to permit the bath liquid to boil at atmospheric pressure in the drum but it should be understood that the pressure at which it boils can be varied by any suitable means so as to vary the boiling point. An increase in pressure will not only raise the boiling point of the liquid in the drum but will result in a higher average temperature in the converter for the temperature of the condensate which in turn is one of the main controlling factors of the bath inlet temperature in the bottom of the converter is, of course, controlled by the pressure under which the vapors condense. Moreover the higher pressure necessitates greater superheating before geyser action takes place and will, therefore, tend to slow up the circulation to a point where the temperature of the bath in the upper part of the converter is sufficiently increased to provide for the requisite amount of geyser action to maintain the circulation at a sufficient rate to absorb the heat of reaction. Correspondingly, a vacuum on the drum will lower the average temperature in the converter by speeding up the geyser circulation and by lowering the temperature of the condensate returned to the converter. Variations in pressure constitute a very simple means of varying the average temperature in the converter or the temperature in the bath adjacent to the zone of maximum reaction. This makes it a simple matter to vary the temperature at will which is convenient in many reactions as catalysts sometimes deteriorate and require higher temperatures than when they are fresh. It is, of course, an easy matter to vary the boiling point of the bath in the drum when the latter is an alloy by varying the composition as described in United States Patent No. 1,666,251 but there is an advantage in using pressure variations to effect temperature variations as the latter can be regulated almost instantaneously whereas a considerable although not very long period of time is required to effect corresponding variations in composition of an alloy bath. In the drawings, no pressure devices are shown as their construction is thoroughly known in the art and the particular design of pressure means forms no part of the present invention.

It will be apparent then that the present invention provides for an automatic heat absorption means at constant temperature and at the same time possesses all of the advantages of systems which do not use a boiling bath in contact with the catalyst tubes and permits, of course, the maintenance of desired temperature differentials between different portions of the converter. In the preferred modifications in which the variations of pressure are secured hydrostatically there are no moving parts and the speed of circulation is automatically varied by the amount of geyser action as well as by the difference in specific gravity of the hot and cool legs of the circuit and as the geyser action increases very rapidly when the superheating of the liquid in the top of the converter increases a most effective control of exotherm is obtained. The invention, of course, is not limited to this method of circulation and if desired mechanical circulating means, such as pumps, impellers, and the like may be used and where large converters are contemplated it is frequently advantageous to provide an impeller in the central portion of the converter to insure uniformly rapid circulation of the bath liquid around all of the catalyst compartments.

Another advantage of the present system lies in the fact that while under normal operation no boiling takes place in contact with the catalyst tubes, in the case of a temporary emergency resulting in a sudden enormous increase in exotherm the latent heat of the bath may be considered as a safety valve and will prevent explosion or serious disturbances when the operating conditions are temporarily deranged to an extreme extent. Normally, however, boiling in the converter is permitted and hence for normal operation the pressure should be chosen sufficiently high so that there will be no boiling. With heavy bath liquids, such as metals, this is of course very easy as then the raise of level of only two feet will put a pressure of 10-12 pounds on the liquid in the top of the converter which, of course, means a much higher boiling point. In some cases even greater difference in level may be necessary either to assure a sufficiently great pressure in the converter to prevent boiling or to assure a more rapid circulation for, of course, the geyser effect increases very markedly with the conditions in pressure between the converter and the vapor disengaging vessel.

Many of the alloys used are solids at ordinary temperatures. Some melt at about the boiling point of water or a little above, others require quite a high temperature. When starting up it is, of course, necessary to l'quefy the bath in the circuit outside of the converter as well as the mass of bath inside the converter and, therefore, the external circuit may be provided with heating jackets for steam, hot oil, or any other medium such as hot air, or, as is preferable in many installations, suitable electric heaters may be employed. The drawings, which are purely digrammatic in nature do not show these heaters as their construction is well known and forms no part of the present invention, any suitable heater design being usable. The heating, particularly of the riser pipes, may be used only for starting up or the heating may be continued during running in order to increase the speed of circulation and particularly the geyser action which would be slowed down and in some cases practically stopped if the riser pipes are unduly cooled. In general no insulation is shown in the drawings as its application is well known and the particular type of insulation forms no part of the present invention. The drawings also show by way of example air cooled reflux condensers which are very satisfactory when using metal baths. However, water-cooled refluxes of any suitable design may be used and are sometimes of advantage where the amount of cooling by ebullition in the vapor drums is sufficient to warrant utilizing the heating of condensation to raise steam. Such water cooled refluxes are well known in the art and any suitable type may be used in the present invention.

The invention will be illustrated in greater detail in connection with the drawings, which show diagrammatical representations of typical apparatus in which the process of the present invention can be carried out.

Fig. 1 is a section through a vertical tubular converter showing lateral circulation pipes.

Fig. 2 is a vertical section through a vertical tubular converter showing central riser pipes;

Fig. 3. is a vertical section through a modified type of reverse flow tubular converter;

Fig. 4 is an enlarged detailed section through the single catalyst tube shown in Fig. 3; and Fig. 5 illustrates a modified form of tubular converter with mechanical circulating means.

In the construction shown in Fig. 2 the converter consists of a shell 1, top piece 2, bottom piece 3 and catalyst tubes 4. The gas inlet 5 serves to introduce reaction gases into the top piece 2 and an outlet 6 removes reacted gases from the bottom piece 3. A ring shaped vapor releasing drum 7 is mounted above the level of the converter and connects with the bath space in the converter shell through riser pipes 8, which discharge into the upper portion of the drum 7. The lower portion of the liquid space in the drum 7 connects with the bottom of the shell through the return flow pipes 9 and reflux condensers 10, shown by way of illustration as air cooled condensers of the steam superheater type, and serve to condense vapors released in the drum 7. The whole system is filled with a suitable bath in the drum 7, as shown. Preferably, when filled cold the level is below the middle of the drum so as to provide for expansion space when the liquid is heated.

In Fig. 2 the like parts bear like numerals. This construction is in essence the same as that in Fig. 1 except that a central drum is provided, and the riser pipes 8 instead of connecting directly with the sides of the shell bend inwardly and pass down through the center of the top piece 2 through stuffing boxes 11. This design permits a somewhat better circulation for large converters and prevents any stagnant bath around the central tubes.

The operation of Figs. 1 and 2 is the same. For example if the process is to be used for the production of phthalic anhydride by the air oxidation of naphthalene, a bath which may be mercury or an alloy of mercury, for example an alloy of mercury and lead, having the desired boiling point, is filled into the converter. The converter is heated, which may advantageously be effected by passing hot air through the catalyst tubes, or in some cases by heating the outside shell, for example with electric heaters, until the bath has reached the desired temperature. At the same time the circulating tubes are also heated sufficiently to keep the bath molten. After a sufficient temperature has been obtained in the converter the heating of the return pipes 9 is shut off and the bath begins to circulate, and when finally heated sufficiently will boil in the drums 7, the geyser action through the pipes 8 increasing the speed of circulation.

When a suitable temperature has been obtained in the converter a naphthalene-air mixture is introduced into the top piece 2, passes down through the catalyst tubes 4 where the partial oxidation takes place, and the vapors containing phthalic anhydride pass out through the exhaust pipe 6. The reaction involves large quantities of heat, which heat up the bath and cause it to circulate, the excess heat being removed in the drum 7, and in some cases in the riser pipes 8 by boiling of the bath. The temperature in the upper portion of the converter should preferably be about 100° hotter than the lower portion, and may for example, with suitable catalysts, be about 400° in the hottest part and about 300° in the bottom. This temperature differential is continuously maintained by the vigorous and rapid circulation, and the temperature of the bath entering the lower portion of the shell is maintained uniform as the liquid leaving the drum 7 is of course always at the boiling point of the bath under atmospheric pressure or if pressure regulating means (not shown) are used at the boiling temperature corresponding to the pressure. The relatively cool lower portion of the converter prevents undue decomposition of the phthalic anhydride formed in the upper portion of the catalyst tubes, where the reaction is of course most violent since this portion of the catalyst encounters the greatest concentration of reaction gases. The speed of circulation is automatically maintained in proportion to the heat evolved, and the temperature in the bottom of the converter may be varied by regulating the cooling of the return pipes 9.

In a similar manner other exothermic reactions can be carried out, for example other organic oxidations or the contact sulfuric acid process, the correct temperature in the upper and lower portions of the converter of course being chosen in order to secure the most favorable results in the reaction.

The operation of the converter shown in Fig. 2 is of course identical with that in Fig. 1, but as the riser pipes pass through the top piece 2 it is necessary to provide the stuffing boxes 11 so that the top piece can be raised when it becomes necessary to fill in catalyst. Obviously, of course a combination of center and side riser pipes may be used, and for very large converters with highly exothermic reactions where the heat evolved is very great such a construction is desirable; the operation is of course identical, and the number and location of riser pipes will be chosen by the skilled engineer in order to produce a circulation of the desired effectiveness and to maintain the best temperatures in the different portions of the converter.

In the construction shown in Figs. 3 and 4 the catalyst tube construction is somewhat modified; instead of plain catalyst tubes passing down through a bath the tubes 14 are closed at the bottom end and contain open end center tubes 12 provided with perforations 13 at their bottom ends. These open end tubes extend through a perforated plate 15 below the top piece 2. The catalyst is arranged in the annular space between the tubes 12 and the tubes 14, as is clearly shown in Fig. 4. The reaction gases enter in the top piece 2, pass downwardly through the tubes 12 where they absorb heat from the catalyst, then they exit into the catalyst and pass upwardly into the space between the perforated plate 15 and the upper tube sheet 16 and thence out through the exhaust pipe 6. This construction permits of efficient preheating, and as the catalyst is in the form of a thin annulus cooled on the inside by the incoming cooled reaction gases and on the outside by the bath, a very intense cooling effect is obtained. There is also an advantage in construction as only a single tube sheet is used and the tubes 12 and 14 are free to expand and contract. The gases encountering the first portions of the catalyst also come in contact with the coolest part of the bath and are therefore intensely cooled, which is of importance in reactions where the exotherm is very high or the reaction velocity is very great so that most of the exotherm is set free in a very short layer of catalyst. This is, for example, true in the oxidation of some organic compounds such as naphthalene to phthalic anhydride and benzol to maleic acid with certain catalysts which are very active. As the hot bath tends to rise, a relatively uniform bath temperature is obtained throughout the converter. This is advantageous for certain reactions, but renders the type of converter less suitable for other reactions, such as for example the contact sulfuric acid process, where a considerable differential of temperature is desired in different parts of the converter. For such reactions the converter can be inverted so that the catalyst tubes will extend upwardly instead of downwardly. In such a case, of course, the most intense reaction takes place in the upper portion of the converter shell and a bath temperature gradient of the type described in connection with Figs. 1 and 2 can be readily obtained. The inverted construction will be perfectly obvious to any skilled chemical engineer.

The modifications of the invention described in connection with Figs. 1 to 4 all show a vertical converter. For most reactions this type of converter may be considered as the preferred form, and it possesses many advantages, such as excess of catalyst filling and constant assurance that the tubes continuously remain filled with catalyst, uniform pressure on the bath liquid for any horizontal cross section, etc. The invention, however, is in no sense limited to its application to vertical converters and horizontal converters or converters at any desired inclination can be used to carry out the process. Such modifications will be clear to the skilled chemical engineer and have not been illustrated as the drawings are not intended to illustrate all possible types of converters for the invention is applicable to a large number of different converter designs. For the same reason the drawings are purely diagrammatical and structural features such as insulation, provision of pyrometers for measuring bath and catalyst temperatures at different levels, perforated plates or screens for retaining catalyst in the tubes in Figs. 1 and 2, and the like have been omitted as all these and other structural refinements of design are well known to chemical engineers skilled in the construction of apparatus for vapor phase catalysis and these particular design features do not form any part of the present invention, it being understood that in every installation the skilled engineer will adopt the structural design best suited for the conditions under which his installation is to operate.

Fig. 5 illustrates a tubular converter provided with mechanical circulation and a somewhat different design of external circulation. In this converter the catalyst tube forms a central zone and the external shell extends to a greater height than the top of the catalyst tubes, a circular baffle 17 is mounted spaced from the outer well of the shell and extends from a point a little above the bottom of the bath to a point a little below its highest level in the high level portion. A central well 18 is also provided with a screw impeller 19 driven by a shaft 20 passing through stuffing boxes 21 in the top piece 2 and upper tube sheet respectively. The well is provided with openings 22 at the bottom and 23 about half way up. Just below the openings 23 is a baffle wall 24 through which the tubes extend. This circular baffle is fastened at its edge to the baffle 17. In operation the liquid bath fills the whole of the space around the catalyst tubes and extends up to a higher level in the ring shaped portion formed by the extension of the outer shell. The gases enter the top piece through inlet 5, pass down through the catalyst tubes 4, enter the bottom piece 3 and then out through the pipe 6. The liquid between circular baffle 17 and the outside wall is cooled by contact with the catalyst, which may be partly or wholly uninsulated or which may be provided with a sufficiently thin insulation to bring about the desired cooling effect. The cold bath flows under the lower edge of the baffle 17 as indicated by the arrows, thence across the lower ends of the catalyst tubes 4 in through the openings 22 into the well 18 where it is rapidly driven up by the screw 19 and leaves through the openings 23, passing outwardly over the upper portion of the tubes 4 above the baffle wall 24, and then flows up along the baffle 17 and over its upper edge, beginning to boil as it reaches the liquid surface down to lowering of pressure. The vapors are condensed in the refluxes 10 and returned. The cooled liquid then flows down on the outside of the baffle 17, and the cycle is resumed. The type of converter is very satisfactory for large sizes with highly exothermic reactions as a more uniform and more vigorous circulation is effected by the addition of the mechanical impeller than can be provided where the thermosiphon effect of the liquid columns of different temperatures is relied upon as the sole means for effecting circulation. The baffle wall 24, which may for example be a plate fitting around the tubes, may in some cases be dispensed with. When it is absent the circulation will be the same but will be slightly less vigorous, and there is sometimes a tendency to form eddies in the central portion of the converter. Where very high reaction velocities are desired this baffling is helpful, but in many cases where extreme circulation velocities are not essential it may be dispensed with.

In Fig. 5 the tube spacing and the volume of liquid surrounding the baffle 17 is shown very large for the sake of clearness. It should be clearly understood that in a commercial installation it is normally desirable to space the tubes much more closely and to provide smaller circulating spaces in order to save bath liquid and to obtain a more compact apparatus. The circulation is the same whether the spacing is close or wide except for friction effects, and the present invention is not limited to any particular spacing nor to any particular size of catalyst tubes. However, the catalyst tube should normally be small, and preferably where highly exothermic reactions such as the oxidation of organic compounds is undertaken the tubes should not exceed 2.5 cm. in diameter though with some catalysts even in highly exothermic reactions it is possible to use large tubes. The drawings, however, show a relatively wide spacing so that the construction and operation may be clear, but of course are only diagrammatic and do not give any indications of actual scale for commercial apparatus. It should be noted that the provision for mechanical circulation illustrated in Fig. 5 may also be embodied in the converter circuits shown in Figs. 1, 2 and 3, and similarly the converter circuit shown in Fig. 5 may be used without mechanical circulation, in which case of course the baffle 24 is eliminated. The catalyst tubes have been shown as filled with catalyst in some of the figures and as partly filled in others. The invention is not limited to any particular depth of catalyst filling, any more than it is limited to any class of catalyst. Where gases enter at a relatively high temperature or where the reaction is initiated at a comparatively low temperature, tubes full of catalyst represent a desirable economy of space. In other reactions, where the gases must be heated up to a high temperature before reaction begins, the upper portion of the tubes in converters of the type shown in Figs. 1, 2 and 5 may be left empty or filled with blank filling bodies so as to act as preheaters for the reaction gases. Of course even tubes filled with catalyst will act as preheaters in their upper portion, if the incoming gases are at temperatures below that of reaction. The most satisfactory filling, the best temperature for entrance gases, and other facts will of course be determined in any particular installation by the skilled catalytic chemist in accordance with the requirements and conditions of the particular reaction which he desires to carry out.

In addition to the few representative reactions described above, for which the process of the present invention is particularly suited, many other exothermic vapor phase reactions may be carried out, thus for example in addition to the oxidation of benzol or phenols to maleic acid other compounds containing the group

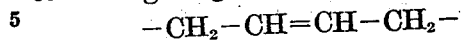

may be oxidized to maleic and fumaric or mesotartaric acid; cresol can be oxidized to salicylaldehyde and salicylic acid; toluol and various halogen and nitro substituted toluols or other aromatic side chain compounds such as xylenes, pseudocumene, mesitylene, paracymene, and the like, may be oxidized to the corresponding aldehydes and acids with air or with other oxidizing gases such as for example mixtures of oxygen and nitrogen containing a smaller percentage of oxygen than air, mixtures of carbon dioxide and oxygen and the like. Phenanthrene may be oxidized to phenanthraquinone, diphenic acid, phthalic anhydride and maleic acid; fluorene to fluorenone; eugenol and isoeugenol to vanillin and vanillic acid; methyl alcohol and methane to formaldehyde, ethyl alcohol to acetic acid; ethylene chlorhydrine to chloracetic acid, and the like.

Another important series of organic reactions which are strongly exothermic are the purifications of crude compounds by selective burning out of impurities, such as for example the catalytic purification of crude anthracenes with various degrees of impurity with total combustion of carbazole, dead oils and in some cases phenanthrene; purification of crude naphthalenes and crude mononuclear hydrocarbons, such as benzols and the like; purification of ammonia from coal tar with the burning out of organic impurities such as phenolic bodies or sulfur compounds, both organic and inorganic.

Reactions in which mixtures of organic compounds are oxidized to intermediate compounds with removal of impurities are also effectively carried out by means of the present process, thus for example crude anthracenes, phenanthrenes and the like may be oxidized to anthraquinone, phenanthraquinone, diphenic acid or phthalic anhydride with concomitant removal of carbazole and dead oils by total combustion. The oxidation of crude tar acids to maleic and fumaric acids with combustion of certain impurities is another example.

Many reductions and hydrogenations are strongly exothermic, such as for example the reduction of many nitro compounds, as nitrobenzene, dinitrobenzene, nitrophenol, nitronaphthalene and their homologues to the corresponding amines or hydrogenated amines. The reduction of carbon monoxide to methane, higher alcohols, ketones or petroleum like products, the hydrogenation of aromatic compounds to alicyclic compounds, such as benzene to cyclohexane, naphthalene to tetraline or decaline, anthracene to hydrogenated anthracenes, phenol to cyclohexanol, acetylene to ethylene and ethane, and the like.

Composite reactions in which oxides of carbon are reduced in the presence of other organic compounds, aliphatic, alicyclic or aromatic, are also in many cases strongly exothermic and well suited for the present process.

In addition to the extremely important contact sulfuric acid process there are other inorganic catalyses which are exothermic and which can be effectively carried out by means of the present invention. Examples of such reactions are the synthesis of ammonia from its elements, the oxidation of ammonia to oxides of nitrogen, and the like.

What is claimed as new is:

1. A method of carrying out vapor phase catalytic reactions, which comprises passing reaction gases through at least one catalyst reaction zone, absorbing the exothermic heat of reaction by a non-boiling liquid in heat exchanging relation thereto, removing the liquid from the catalytic zone, reducing its pressure to permit a part at least of the exothermic heat absorbed to be given off as latent heat of vaporization, condensing the vapors and returning the condensate and unboiled liquid to the catalytic zone at the pressure there existing.

2. A method of carrying out catalytic vapor phase exothermic reactions, which comprises passing the reacting gases through a plurality of catalytic compartments or zones, absorbing the exothermic heat by circulating a non-boiling liquid under pressure around the catalyst compartments, removing the liquid from the catalytic zone, reducing its pressure to a point at which part at least of the liquid boils, condensing the vapors and returning the condensate together with the unboiled liquid to the catalytic zone.

3. A method of carrying out exothermic catalytic vapor phase reactions, which comprises causing the reacting gases to pass through at least one catalytic compartment or zone, abstracting the exothermic heat by the circulation of a bath liquid thereover, under sufficient pressure to prevent boiling of the liquid, subjecting the bath liquid after heating by the catalyst to a lower pressure, which, however, is different from that of the atmosphere, the circulation and character of the bath liquid being such that at least part of it will boil at this lower pressure, condensing the vapors and recirculating the condensate, together with the unboiled bath liquid, over the catalytic zone.

4. A method of carrying out exothermic catalytic vapor phase reactions, which comprises passing reacting gases through at least one catalyst compartment, or zone, circulating a liquid over the catalytic zone at a pressure not greatly exceeding that sufficient to prevent ebullition of the bath liquid, the circulation being adjusted so that after the bath has absorbed exothermic heat in the form of sensible heat by passing over the catalyst zone or zones it is at a temperature not greatly below its boiling point at the particular pressure, causing the bath liquid to move to a zone of lower pressure at a higher level than that of the catalyst zone, whereby the ebullition of the liquid exerts a geyser action and increases the circulation speed, condensing the vapors of the boiling liquid and recirculating condensate and unboiled liquid over the catalytic zone or zones.

5. A method of carrying out exothermic vapor phase reactions, which comprises causing reacting gases to pass through at least one catalytic compartment, circulating a liquid metal bath in heat exchanging relation to the catalytic zone or zones at a pressure sufficient to prevent the bath from boiling, circulating the bath to a point of sufficiently lower pressure to cause the bath to boil, condensing the vapors and returning the condensate and unboiled bath to the catalytic zone or zones.

6. A method of carrying out vapor phase catalytic reactions which require for optimum conditions a temperature gradient in the reaction zone, which comprises causing the reacting gases to pass through at least one catalytic compartment, or zone, circulating a bath around said zone from the portion thereof which is to be at lower temperature to the portion thereof which is to be at higher temperature under sufficient pressure so that the bath will not boil, circulating the bath from the catalytic zone, or zones, to a point at which the pressure is sufficiently low to cause boiling of the bath, condensing the vapors and returning the condensate and unboiled bath to the catalytic zone.

7. A method of oxidizing naphthalene to phthalic anhydride by means of oxygen-containing gases in the vapor phase, which comprises passing a mixture of naphthalene vapors and oxygen-containing gas through a catalyst zone containing one or more catalyst compartments in parallel, absorbing the exothermic heat of reaction by circulating a non-boiling liquid over the reaction compartments, removing the liquid from the catalytic zone and reducing its pressure, to permit a part at least of the exothermic heat absorbed to be given off as latent heat of vaporization by boiling of the liquid, condensing the vapors and returning the condensate and unboiled liquid to the catalytic zone at the pressure there existing.

8. A method according to claim 7, in which the circulation of the non-boiling liquid over the reaction compartments is in countercurrent to the flow of the reaction gases through the compartments.

9. A method according to claim 7, in which the reduction of pressure is brought about by causing the circulating, non-boiling liquid to flow to a higher level in the liquid circuit where it is under a lower hydrostatic pressure.

Signed at Pittsburgh, Pennsylvania, this 3rd day of May, 1928.

ALPHONS O. JAEGER.